Patented Jan. 23, 1934

1,944,418

UNITED STATES PATENT OFFICE 1,944,418

DEVICE FOR PROTECTING INTERNAL COMBUSTION ENGINES AGAINST BACK FIRING

Henri Feuillée, Gentilly, France

Application March 23, 1932, Serial No. 600,755, and in France December 14, 1931

5 Claims. (Cl. 123—142)

My invention relates to a device for protecting internal combustion engines against back firing. The essential characteristic of this device is that it automatically cuts off the supply of fuel mixture to of one or more cylinders, in case a continuous back firing occurs by reason for instance of a broken or jammed admission valve.

In a multi-cylinder motor where protection against fire is ensured by means of a non-return or antiback firing device of a type known per se, the flames that impinge on the non-return device at a very great frequency finally succeed in heating the latter thereby lowering its efficiency. On the other hand the continued back pressures which are produced in the inlet system are the cause of a very uncertain and irregular running of the engine.

The device according to the present invention eliminates all these defects by stopping the working of the cylinder or cylinders which are the cause of the bad working of the engine.

The said device functions automatically by means of the action of the heat liberated by the gases blown back.

On the accompanying drawing showing by way of example a few embodiments of the device, Fig. 1 is a longitudinal section of an inlet pipe provided with a flap valve or shutter, closing by reason of the heat acting on a deformable couple or on a manometric tube.

Figure 1:
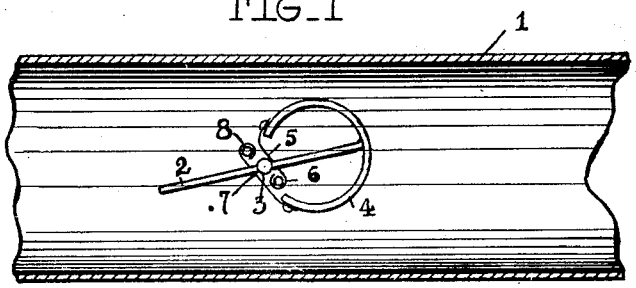
Figure 2:
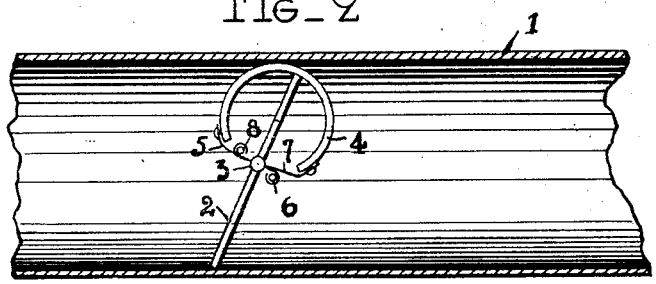
Fig. 2 shows the flap valve in its closed position.

In the device shown in Figs. 1 and 2, 1 denotes the fuel admission pipe in the interior of which a flap valve or shutter 2 is pivotally mounted on a spindle 3 fixed in the pipe. The flap valve or shutter 2 is provided at one extremity with a deformable couple 4, of circular shape and consisting of two metals having different coefficients of expansion. Also a manometric tube of the Bourdon type may be used, or any other device capable of being deformed by change of temperature. One of the extremities of the couple 4 is connected by means of a small rod 5 to a lug 6 fixed in the pipe 1. The other extremity of the couple 4 is connected, by means of a small connecting rod 7 to a second lug 8 also fixed in the pipe 1. The flap or shutter 2, which is normally kept open, automatically closes, as soon as the flames from the back fire heat the couple or the Bourdon tube 4, the two extremities of which while receding from one another thus exert a pull on the rods 5 and 7 which in turn cause the shutter or flap valve 2 to rotate about the spindle 3 moving it into the closed position as shown in Fig. 2. When the flap valve or shutter is in this position, the admission pipe is completely closed.

Figures 3, 4:
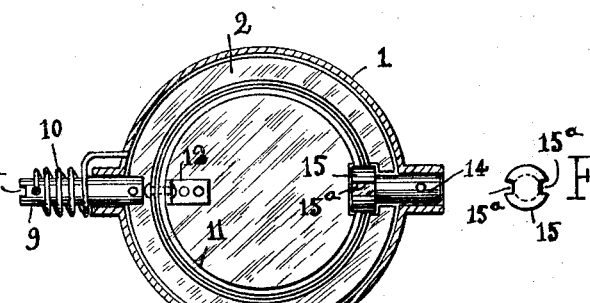
Fig. 3 is a cross section of an admission pipe equipped with a flap valve in conjunction with a deformable couple combined with a locking rack or click.
Fig. 4 is a view of a detail thereof.

In the arrangement shown in Fig. 3 the admission pipe 1 is provided with a flap valve or shutter 2 mounted on a spindle 9 controlled by a spring 10 and free to rotate in the pipe 1. On the flap valve or shutter 2 is mounted a circular and deformable couple 11 consisting of two members of metal having different coefficients of expansion, the couple being mounted on the flap valve or shutter by means of a bracket 12.

On the opposite side of the admission pipe 1 is mounted a spindle 14 which carries a boss 15 formed with notches 15ª into which the two extremities of the deformable couple 11 engage when the shutter 2 is in its normal or open position. In Fig. 3, the said flap or shutter is shown in its closed position which it automatically assumes, when by reason of the action of the heat of the gases back fired the deformable couple 11 opens out thus releasing its extremities from engagement with the notches 15ª in the stationary boss 15. As soon as the extremities of the deformable couple 11 have moved out of the notches of the ratchet, the shutter or flap valve 2 by the spring 10 is moved to its closed position (Fig. 3). If it is desired later to bring the shutter back into its normal open position it suffices to turn the spindle 9 by means of a screw driver or equivalent tool engaging in the slot 9ª provided for this purpose.

Figure 5:
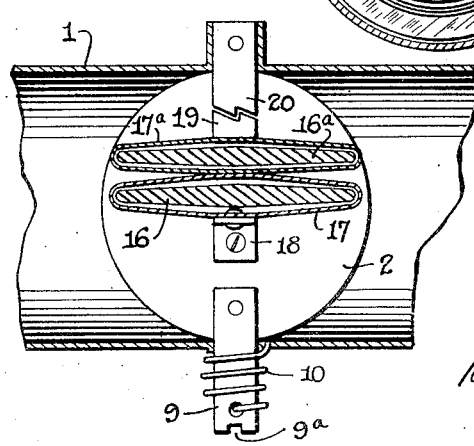
Fig. 5 is a longitudinal section of an admission pipe, the flap valve of which is controlled by means of the expansion of metallic couples provided with membranes.

In the arrangement shown in Fig. 5, the admission pipe is also provided with a shutter or flap 2 which is mounted on a rotatable spindle 9 acted upon by the spring 10. On this shutter or flap the thermal expanding couples are mounted these being composed of metallic members 16, 16ª surrounded by deformable metallic membrane 17, 17ª the expansion coefficient of which is less than that of the members 16. The membrane 17 is fixed on a right angle bracket 18 mounted on said flap valve or shutter, and the membrane 17ª is mounted on the membrane 17. The deformable membrane 17ª is provided with a ratchet member 19 which is adapted to engage with a ratchet 20 fixed in or on the wall of the admission pipe 1.

In Fig. 5 the shutter or flap 2 is shown in its open position. In the event of repeated back firing, that is to say, a back firing that cannot be stopped by the driver, the heat liberated by the gases blown back will act upon the deformable couples, and as the members 16, 16ª expand more than the membranes 17, 17ª the latter are flattened out at their centre in such a manner as to diminish the total thickness of the deformable unit. Therefore the ratchet 19 becomes disengaged from the ratchet 20 and allows the shutter 2 to swing around with its spindle 9 under the action of the spring 10 into its closed position thereby cutting off all fuel supply.

If it is desired to restore the shutter or flap valve to its open position, it suffices to turn the spindle 9 by means of a screw driver engaging the slot 9ª.

The number of the deformable elements may be more or less, according to the metals used, and also according to the sensitivity the apparatus is intended to have, it being thus possible to cause it to act at an exact predetermined temperature.

It is evident that the device forming the subject matter of the present invention only acts if the back firing occurs repeatedly. If the motor is fitted with an ordinary anti-back-firing apparatus, the present device will prevent the usual apparatus becoming inefficient. In short the present device possesses a sufficient inertia to prevent any unnecessary stopping of one or more cylinders in case the back-firing is only occasional and not dangerous to the engine if they are arrested by the usual apparatus.

One may of course employ other embodiments or means without departing from the scope of the present invention, and the details of the design and assembly may also be varied. On the other hand the various elements may be replaced by others serving the same purpose and giving the same result. It is also well understood that any suitable material and any product may be used, especially for the deformable elements. The device according to this invention is adaptable to all engines or to engines which it might be necessary to stop so as to avoid any accidents.

I claim:

1. In combination with the fuel supply conduit leading to the cylinder of an internal combustion engine, of a closing member movably mounted in said conduit, and means capable of being deformed by changes in temperature and operatively so connected with said closing member to move the same into closing position upon being subjected to heat above a predetermined temperature.

2. In combination with the fuel supply conduit leading to the cylinder of an internal combustion engine, of a closing member movably mounted in said conduit, a thermal couple capable of expansion by heat attached to said closing member and to fixed points in said conduit so as to move said closing member into closing position upon being subjected to heat beyond a predetermined temperature.

3. In combination with the fuel supply conduit leading to the cylinder of an internal combustion engine, of a spring-controlled closing member movably mounted in said conduit, a thermal couple capable of expansion by heat mounted on said closing member, a fixed part engaging the free ends of said thermal couple, so as to enable the latter to be released on being expanded by heat exceeding a predetermined temperature, thus allowing said closing member to be moved into closing position by its spring.

4. The combination as specified in claim 9, including a rotatable spindle carrying said closing member and encircled by the spring controlling the same, said spindle having in its outwardly projecting end a notch for the engagement of a tool.

5. In combination with the fuel supply conduit leading to the cylinder of an internal combustion engine, of a closing member movably mounted in said conduit, a rotatable spindle carrying said closing member, a spring encircling said spindle tending to rotate the same in a direction to move said closing member into closed position, expansible members carried by said closing member and surrounded by expansible membranes of a smaller expansion coefficient than that of said expansible members, a fixed clutch member in said conduit and a coacting clutch member carried by one of said membranes so as to be disengaged from said fixed clutch member upon said expansible members and membranes being subjected to heat above a predetermined temperature.

HENRI FEUILLÉE.